May 28, 1968  R. J. BROWN, JR  3,385,063

MULTI-STAGE SOLID PROPELLANT MOTOR

Filed March 19, 1962

INVENTOR.
RALPH J. BROWN, JR.

BY
ATTORNEY

United States Patent Office 3,385,063
Patented May 28, 1968

3,385,063
MULTI-STAGE SOLID PROPELLANT MOTOR
Ralph J. Brown, Jr., Mountain View, Calif., assignor, by mesne assignments, to the United States of America as represented by the Secretary of the Air Force
Filed Mar. 19, 1962, Ser. No. 180,881
1 Claim. (Cl. 60—225)

This invention relates to a solid propellant rocket motor and in particular to a multi-stage solid propellant rocket motor.

Heretofore multi-stage solid propellant rocket motors have comprised two or more separate rocket stages each of which includes a combustion chamber section, a throat section, and a nozzle section, one mounted on top of the other. These motors have had the disadvantage that they are substantially long and of great weight. Also, inter-stage attachments are required to attach the upper stage to the lower stage. Still further, difficulties have been encountered in providing shockless ignition and separation of successive stages of the rocket motor and programming systems have been required to properly time the ignition of a second stage combustion chamber upon burn-out of a first stage rocket motor.

It is therefore the general object of this invention to overcome the above-noted disadvantages and eliminate some of the structure herebefore required by providing a multi-stage rocket motor in which the nozzle section of a second stage combustion chamber also serves as the forward portion of the first stage combustion chamber.

Another object of the invention is to provide means for separating the first stage from the second stage of the rocket motor upon complete burn-out of the solid rocket propellant grain in the first stage.

A further object of the invention is to provide improved reliability and shockless ignition for the second stage without the need for a separate igniter.

In its principal aspect, the present invention comprises a multi-stage rocket motor including at least a first stage and a second stage, it being understood that additional stages may be provided in a similar or other manner. The first stage includes a combustion chamber section and rearwardly thereof a throat and nozzle section. There is no head provided on the top or forward end of the combustion chamber section. The second stage is provided with a forward head, assuming there would be no other stages on top of it, a combustion chamber section, and throat and nozzle sections. The rear of the nozzle section of the second stage has a diameter equal to that of the combustion chamber section of the first stage and is disposed in fixed relation and is continuous with the forward end of the first stage combustion chamber section. The nozzle of the second stage thereby serves the dual function of a nozzle when separated from the first stage and also acts as the forward portion for the first stage before separation. A solid propellant grain is also provided in the first and second stages and is so shaped as to permit uniform and complete burn-out in the first stage essentially simultaneously with the progression of burning into the grain of and, therefore, ignition of the second stage.

Other objects, aspects, and advantages will become apparent from the following description in connection with the accompanying drawings wherein.

Figure 1:
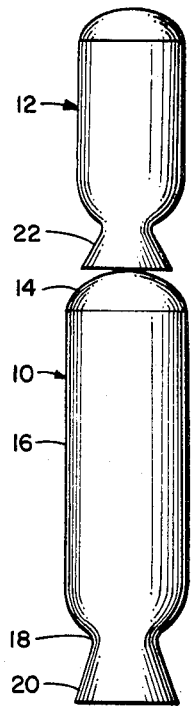
FIGURE 1 is a side elevation view of a typical two-stage solid rocket propellant motor.

Referring now to the drawings in detail, FIGURE 1 shows a multi-stage solid propellant rocket motor of the type now in use. This motor includes a first stage 10 and second stage 12. The first stage has a forward portion 14, a combustion chamber section 16, a throat 18, and a nozzle section 20. The second stage rocket 12 has the same parts as that shown in the first stage and is mounted on top with the nozzle 22 of the second stage usually in close proximity to the forward head 14 of the first stage. Inter-stage attachments, not shown, are required for supporting the second stage on the first stage of the rocket motor. In accordance with this invention the two stage rocket motor in FIGURE 1 has been modified so that the over-all length of the rocket motor is substantially decreased as is the weight decreased.

Figure 2:
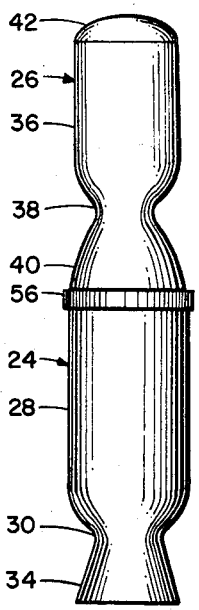
FIGURE 2 is a side elevation view of a solid rocket propellant motor in accordance with this invention.

As seen in FIGURE 2, the rocket of this invention includes a first stage 24 and a second stage 26 mounted forwardly or on top thereof. The first stage includes a combustion chamber section 28, a throat section 30 converging to a diameter smaller than that of the combustion chamber section, and a nozzle section 34 diverging from the throat section 30. It is seen that the first stage is headless, that is to say, it does not include a head on the forward end of the combustion chamber section 28. Instead the second stage sits directly on the combustion chamber section of the first stage. The second stage also includes a combustion chamber section 36, a narrow throat section 38 and a diverging nozzle section 40, the rear portion of which has a diameter equal to the diameter of the combustion chamber section 28 of the first stage. The nozzle 40 of the second stage is therefore continuous with the combustion chamber section 28 of the first stage whereby a multi-stage rocket is provided in generally a single unit. A head 42 is provided on the forward portion of the second stage 26; however, it is appreciated that this head may be eliminated and an additional third stage including a combustion chamber section and nozzle section may be mounted on the second stage in the same fashion as the second stage is mounted on the first stage.

It can be seen by this arrangement that the multi-stage rocket motor of this invention is shorter in length and, in addition, will be lighter than the typical multi-stage rocket shown in FIGURE 1. Also the additional weight and complexity of attachments required between the nozzle 22 on the second stage and nose cone 14 of the first stage of FIGURE 1 is not required in this invention.

Figure 4:
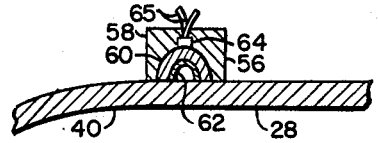
FIGURE 4 is an enlarged fragmentary sectional view of separating means used in the rocket motor in FIGURE 3.
Figure 5:
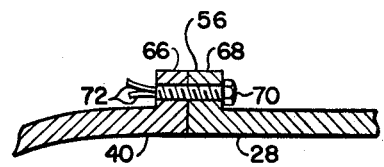
FIGURE 5 is an enlarged fragmentary sectional view of a different embodiment of the separating means for the two stages of the rocket motor.
Figure 3:
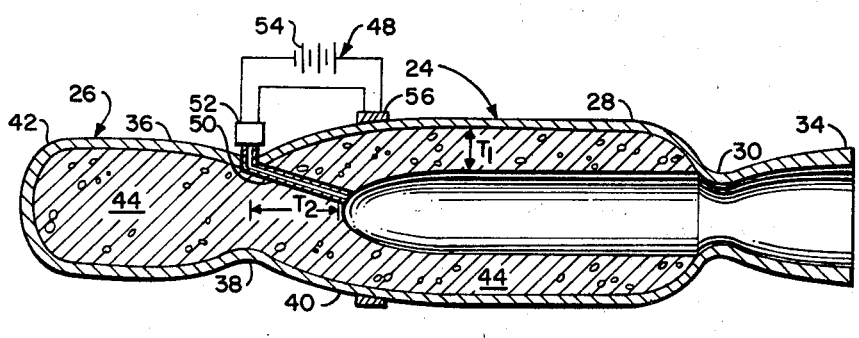
FIGURE 3 is an enlarged longitudinal sectional view of the rocket motor shown in FIGURE 2.

Referring now to FIGURES 3, 4, and 5 which shows the rocket of this invention in a greater detail, a solid propellant grain 44 is provided which completely fills the combustion chamber section of the second stage 26, the throat section 38, and extends into the nozzle section 40 and combustion chamber section 28 of the first stage 24 of the rocket. There, a uniform thickness of the solid propellant grain lines the walls of the combustion chamber section 28 and the rear portion of nozzle section 40 of the second stage. It is noted that the propellant grain 44 completely fills the forward portion of the nozzle 40 of the first stage so that the distance, noted as $T_2$ in FIGURE 3, between the middle of the throat 38 and the rearmost portion of the grain filling the forward portion of nozzle 40 is equal to or greater than the thickness $T_1$ of the grain which lines the remaining internal wall of the nozzle 40 and the walls of the first stage combustion chamber section 28. Due to the configuration of the grain, that is, the grain lining the walls of combustion chamber 28 being of uniform thickness and $T_2$ being equal to or greater than $T_1$, the grain in the first stage 24 will be uniformly burnt and essentially completely extinguished before the burning progresses into the throat section 38, causing ignition of the propellant grain in the combustion chamber section 36 of the second stage 26. Once the second stage propellant grain is burning it is necessary to separate the first stage 24 from the rear of the second stage 26.

The means for separating the first stage from the second stage is generally designated by numeral 48 in FIGURE 3. The separating means includes a pressure tap 50 having one end extending into the forward portion of combustion chamber section 28 and its other end connected to a normally open pressure responsive switch 52. The switch 52 is in a circuit including a power source shown as a battery 54 and an explosive releasing device 56.

Two different embodiments of the explosive releasing device 56 are shown in FIGURES 4 and 5.

Referring now to FIGURE 4, it is seen that the nozzle section 40 of the second stage is not only continuous but is integral with the wall of the combustion chamber section 28 of the first stage. An annular ring 58 surrounds the combustion chamber section 28 at a position which is adjacent the rear of the nozzle section 40 of the second stage. Within the ring 58 there is provided an annular shaped charge 60 and a liner 62 facing the surface of the combustion chamber section 28 of the first stage. An igniter 64 is positioned adjacent to the shaped charge 60 and includes two leads 65 which run to the battery 54 and switch 52 illustrated in FIGURE 3. The configuration of the shaped charge 60 and the position of the liner 62 are both well-known in the explosive art, it being appreciated that when the igniter is fired the shaped charge will tend to vaporize the liner 62 forcing it in a radially inward direction to burn-out the material within its path. This will in turn cause a separation of the nozzle 40 from the combustion chamber section 28 of the first stage.

In the other embodiment of an explosive releasing device 56 shown in FIGURE 5 the nozzle 40 and combustion chamber section 28 are separate and are provided with flanges 66 and 68, respectively. Interconnecting the flanges are a plurality of explosive bolts 70 circumferentially spaced around the body of the rocket motor, there being only one of such bolts shown in FIGURE 5. The bolt includes leads 72 which are connected to the circuit shown in FIGURE 3. It can be seen that detonation of the explosive bolts 70 would permit separation of the nozzle 40 of the second stage 26 from the combustion chamber section 28 of the first stage 24 of the rocket motor.

Referring now to the operation of the separating means 48, the normally open switch 52 is arranged so that when the pressure in the fisrt stage combustion chamber section 28 decreases to a predetermined low level the switch will be closed therefore closing the circuit containing the explosive releasing device 56. It can be appreciated that pressure in the combustion chamber section 28 will not reach said low level until the solid propellant grain therein is essentially completely burnt out and ignition of the propellant in the combustion chamber 36 of the second stage is incipient. If using the explosive releasing device 56 in FIGURE 4, closing the circuit will cause the firing of the igniter 64 which will in turn detonate the shaped charge 60, thereby separating the first stage 24 of the rocket motor from the second stage 26. If explosive bolts were used as shown in FIGURE 5, the closing of switch 52 would detonate the bolts 70 to cause separation of the first stage 24 from the second stage 26. By utilizing the releasing means herein described there is provided a separation of the two stages of the rocket motor with essentially no shock load transmitted from the first stage to the second stage.

It can be seen that I have provided a multi-stage solid propellant rocket motor which is lighter and of simpler design than the typical two-stage rocket motor in which one complete stage is positioned on top of another. Also, since the over-all length of my rocket motor has been substantially decreased from the length of those required in using two complete stages, the rocket may be used to great advantage in areas of limited space such as in submarine installations.

It will, of course, be understood that various changes can be made in the form, details, arrangement, and proportions of the various parts without departing from the spirit and scope of the invention as defined by the appended claim.

I claim:
1. A multi-stage solid propellant rocket motor including at least a first stage and a second stage; said first stage including a combustion chamber section and rearwardly thereof throat and nozzle sections; said second stage being forwardly of said first stage and including a combustion chamber section and rearwardly thereof throat and nozzle sections; said second stage nozzle section being continuous and in fixed relation with said first stage combustion chamber section; a generally uniform thickness of solid propellant grain lining the walls of said first stage combustion chamber section and the rear portion of the walls of said second stage nozzle section, additional solid propellant grain filling said second stage combustion chamber, said second stage throat section and the forward portion of said second stage nozzle section, the thickness of said solid propellant grain lining said walls being equal to or less than the distance between said second stage throat section and the forward portion of the first stage combustion chamber.

References Cited

UNITED STATES PATENTS

| 2,587,243 | 2/1952 | Sweetman | 102—20 |
| 2,809,584 | 10/1957 | Smith | 102—49 |
| 2,814,179 | 11/1957 | Edelman et al. | 60—35.6 |
| 2,981,187 | 4/1961 | Riordan et al. | 102—49 |
| 2,996,985 | 8/1961 | Kratzer | 102—49 |
| 3,067,973 | 12/1962 | Halsey et al. | 102—49 |

FOREIGN PATENTS

| 158,405 | 4/1940 | Austria. |
| 1,003,758 | 11/1951 | France. |

CARLTON R. CROYLE, *Primary Examiner.*

SAMUEL FEINBERG, *Examiner.*